Oct. 23, 1951     A. J. BUSHEMI     2,572,594
PNEUMATIC TIRE
Filed May 27, 1949
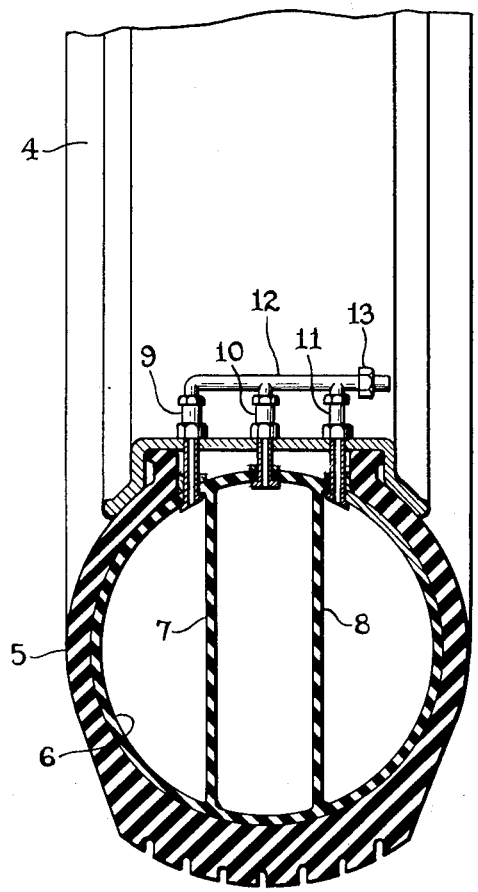
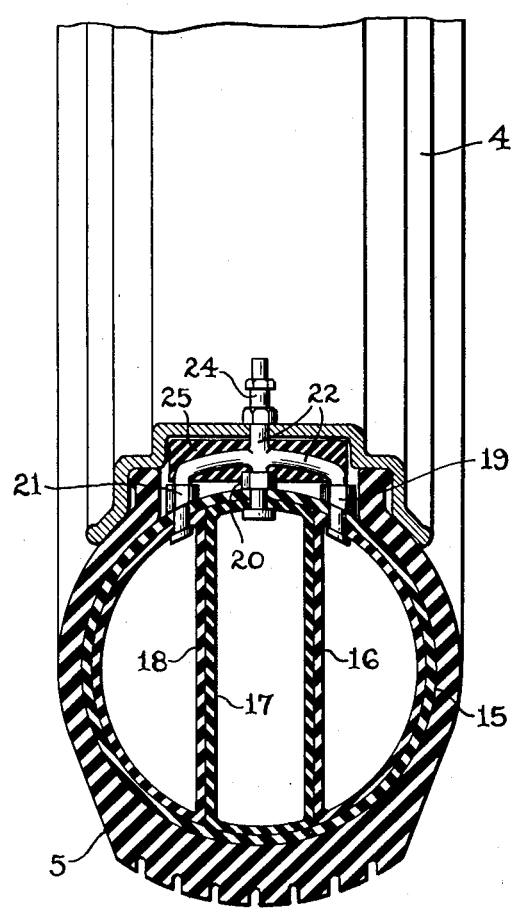
INVENTOR.
ANTHONY J. BUSHEMI
BY
ATTORNEY Patented Oct. 23, 1951

2,572,594

UNITED STATES PATENT OFFICE 2,572,594

PNEUMATIC TIRE

Anthony Joseph Bushemi, Pittsburgh, Pa.

Application May 27, 1949, Serial No. 95,739

2 Claims. (Cl. 152—342)

This invention relates to pneumatic tires, and more particularly to those tires which have inner tubes made into a plurality of separately inflatable sections or compartments, for preventing complete flattening of the tire in case of a puncture or blow-out.

My invention has for its object the provision of a tire of the character referred to wherein the compartments within an inner tube can be filled simultaneously through a single master valve and wherein provision is made to prevent leakage of air into a punctured section, from another inflated section of the inner tube.

Some of the forms which my invention may take are shown in the accompanying drawing, wherein Figure 1 shows an inner tube having partition walls formed integrally therewith and provided with the valve arrangement above referred to, and Fig. 2 is a view showing a modification of the structure of Fig. 1, wherein there are three auxiliary inner tubes disposed within a main inner tube.

Referring first to Fig. 1, a portion of the vehicle rim is indicated by the numeral 4 and a tire shoe by the numeral 5. An inner tube 6 has partitions 7 and 8 formed integrally therewith and extending completely around the inner walls of the tube to form three separate pressure compartments. These compartments are provided with inwardly-opening check valves 9, 10 and 11 respectively, through which air may be introduced to inflate the tire and by which the air will be held against escaping therefrom.

A header conduit 12 is connected to the upper ends of the valves and is provided with a master valve 13 through which the air under pressure will be introduced past the valves 9, 10 and 11 and into the tire. It will thus be seen that the chambers or sections formed by the partitions 7 and 8 will be inflated to approximately the same degree, although if any one of valves 9, 10 and 11 is a little more resistant to the passage of air than the other valves, the slight difference in pressure in the chambers will not be of serious consequence, and at any rate, the pressure within the inner tube 6, as a whole, will be of the desired amount.

If one of the chambers becomes punctured or there is a blow-out at that side, the walls 7 and 8 will be bent and stretched in a direction to engage the punctured wall to effect distribution of the remaining pressure within the tire. For example, the tire may initially have 30 lbs. pressure, and upon a puncture occurring, approximately ⅓ of this pressure may be released. At any rate, there will be sufficient air in the tire to prevent irreparable damage to it through further driving for a short distance or at a slow speed.

Although a single master filling valve 13 is employed for all of the chambers, the check valves 9, 10 and 11 respectively prevent flow of air from an unpunctured chamber, thus insuring that air pressure will be retained in two of the chambers.

Referring now to Fig. 2, I show a structure wherein a main inner tube 15 is of approximately the same form as the tube 6, but which is not provided with integrally-formed partitions. In this case, I provide auxiliary inner tubes 16, 17 and 18 that fill the main inner tube and that are respectively provided with inwardly-opening check valves 19, 20 and 21. A branched conduit or pipe 22 serves as a passageway for air to the valves 19, 20 and 21, the supply of air pressure being introduced through a master filling valve 24. In order to prevent too great distortion of the inner tube 15 by reason of the presence of the conduit 22 and the valves within the channel of the rim, I provide a short filler block 25 at the vicinity of the valves, that may be of medium hard rubber and which is recessed to receive the branched pipe 22.

In this case as in Fig. 1, the auxiliary tubes 16, 17 and 18 will be simultaneously filled and their respective check valves will prevent back flow of air from any of the tubes into any of the other tubes that may have become punctured.

A tire built as in Fig. 2 is not subject to loss of pressure through puncture merely of the tube 15 and can be continued in use long after the tube 15 has been damaged to a considerable extent.

I claim as my invention:

1. A tire structure comprising an inner tube structure having a plurality of annular chambers disposed in relatively side-by-side relation in directions axially of the tire, a branched conduit having an inlet line that is positioned to extend through a hole in the felly portion of a tire rim and having branches that will lie between the rim flanges and each branch extending radially into one of the said chambers, inwardly-opening check valves for the respective branches, to retain air pressure within the various chambers, and a filler block disposed in generally enclosing relationship to the inner part of the conduit and its branches, and between the adjacent surface of the tube and the felly of the tire rim.

2. An inner tube structure as recited in the next preceding claim, wherein the plurality of annular chambers are in the form of auxiliary inner tubes.

ANTHONY JOSEPH BUSHEMI.

REFERENCES CITED

The following references are of record in the file of this patent:

UNITED STATES PATENTS

| Number | Name | Date |
|---|---|---|
| 861,434 | Chatham et al. | July 30, 1907 |
| 1,679,444 | Pagenhart | Aug. 7, 1928 |
| 1,820,857 | Wilson | Aug. 25, 1931 |
| 2,269,244 | Berry | Jan. 6, 1942 |
| 2,440,107 | Maddox | Apr. 20, 1948 |
| 2,468,954 | Bonham | May 3, 1949 |